US010012962B2

(12) United States Patent
Lamers et al.

(10) Patent No.: US 10,012,962 B2
(45) Date of Patent: Jul. 3, 2018

(54) WELDING RESOURCE PERFORMANCE GOAL SYSTEM AND METHOD

(71) Applicant: Illinois Tool Works Inc., Glenview, IL (US)

(72) Inventors: Nathan John Lamers, Appleton, WI (US); Nathan Gerald Leiteritz, Greenville, WI (US); Knut Norman Froland, Green Bay, WI (US); Todd Earl Holverson, Appleton, WI (US); Gregory David Popp, Freedom, WI (US)

(73) Assignee: Illinois Tool Works Inc., Glenview, IL (US)

( * ) Notice: Subject to any disclaimer, the term of this patent is extended or adjusted under 35 U.S.C. 154(b) by 537 days.

(21) Appl. No.: 13/837,976

(22) Filed: Mar. 15, 2013

(65) Prior Publication Data

US 2014/0277684 A1  Sep. 18, 2014

(51) Int. Cl.

| G06F 19/00 | (2018.01) |
|---|---|
| G05B 15/02 | (2006.01) |
| B23K 9/095 | (2006.01) |
| G05B 23/02 | (2006.01) |
| B23K 9/32 | (2006.01) |
| B23K 31/12 | (2006.01) |

(52) U.S. Cl.
CPC .............. *G05B 15/02* (2013.01); *B23K 9/095* (2013.01); *B23K 9/0953* (2013.01); *B23K 9/32* (2013.01); *B23K 31/125* (2013.01); *G05B 23/0216* (2013.01)

(58) Field of Classification Search
CPC .. G05B 15/02; G05B 23/0216; B23K 31/125; B23K 9/32; B23K 9/0953; B23K 9/095
See application file for complete search history.

(56) References Cited

U.S. PATENT DOCUMENTS

| 4,825,038 A | 4/1989 | Smartt |
|---|---|---|
| 6,486,439 B1 | 11/2002 | Spear |

(Continued)

FOREIGN PATENT DOCUMENTS

| CN | 1778990 | 5/2006 |
|---|---|---|
| CN | 101978389 | 2/2011 |

(Continued)

OTHER PUBLICATIONS

International Search Report from PCT application No. PCT/US2014/017862 dated May 8, 2014, 13 pgs.

(Continued)

*Primary Examiner* — Michael D Masinick
(74) *Attorney, Agent, or Firm* — McAndrews, Held & Malloy, Ltd.

(57) ABSTRACT

Metal fabrication systems and related equipment may be monitored by collecting and transmitting parameter data relating to welding operations to a memory and processing system. Goals for selected parameters may be pre-defined, and certain of these may be standard for corresponding welding systems, locations, operations, operators, and so forth. Upon request a web based report is generated and delivered to a user that indicates the system or systems, comparisons of the actual system performance versus the goals, time periods for the comparisons, and so forth.

25 Claims, 10 Drawing Sheets

(56) References Cited

U.S. PATENT DOCUMENTS

| | | |
|---|---|---|
| 6,624,388 B1 | 9/2003 | Blankenship |
| 6,636,776 B1 | 10/2003 | Barton |
| 6,797,921 B1 | 9/2004 | Niedereder |
| 6,809,292 B2 | 10/2004 | Spear |
| 6,858,817 B2 | 2/2005 | Blankenship |
| 6,924,459 B2 | 8/2005 | Spear |
| 7,041,936 B2 | 5/2006 | Oberzaucher |
| 7,643,890 B1 | 1/2010 | Hillen |
| 7,908,302 B1 | 3/2011 | Nagaralu |
| 2004/0099648 A1 | 5/2004 | Hu |
| 2004/0262279 A1 | 12/2004 | Spear |
| 2005/0133488 A1 | 6/2005 | Blankenship |
| 2008/0078811 A1 | 4/2008 | Hillen |
| 2008/0149686 A1 | 6/2008 | Daniel |
| 2009/0173726 A1 | 7/2009 | Davidson |
| 2009/0234483 A1 | 9/2009 | Leko |
| 2009/0313549 A1 | 12/2009 | Casner |
| 2009/0327035 A1 | 12/2009 | Allard |
| 2010/0224610 A1 | 9/2010 | Wallace |
| 2010/0257228 A1 | 10/2010 | Staggs |
| 2010/0299185 A1 | 11/2010 | Caro |
| 2011/0114615 A1* | 5/2011 | Daniel .................. B23K 9/0953 219/137 R |
| 2011/0117527 A1 | 5/2011 | Conrardy |
| 2011/0172796 A1 | 7/2011 | Sohmshetty |
| 2012/0136692 A1 | 5/2012 | Ohishi |
| 2012/0193330 A1 | 8/2012 | Edwards |
| 2012/0226478 A1 | 9/2012 | Bender |
| 2013/0075380 A1 | 3/2013 | Albrech |
| 2015/0121309 A1 | 4/2015 | Reed |

FOREIGN PATENT DOCUMENTS

| | | |
|---|---|---|
| CN | 102922089 | 2/2013 |
| EP | 1295673 A1 | 3/2003 |
| EP | 1958738 | 8/2008 |
| GB | 2454232 | 5/2009 |
| JP | H1147950 | 2/1999 |
| JP | 2003211378 A | 7/2003 |
| KR | 20120017189 | 2/2012 |
| WO | 02058878 A1 | 8/2002 |
| WO | 2012000650 | 1/2012 |

OTHER PUBLICATIONS

Gilsinn, Jim et al.: "A Welding Cell That Supports Remote Collaboration", Ninth International Conference on Computer Technology in Welding, Sep. 30, 1999.

International Search Report from PCT application No. PCT/US2014/017863 dated May 12, 2014, 21 pgs.

International Search Report from PCT application No. PCT/US2014/45049, dated Jan. 29, 2015, 9 pgs.

"How to Measure Performance—A Handbook of Techniques and Tools," U.S. Department of Energy, Oct. 1, 1995, http://www.orau.gov/pbm/handbook/handbook_all.pdf.

International Search Report from PCT application No. PCT/US2014/020920 dated May 12, 2014, 11 pgs.

International Search Report from PCT application No. PCT/US2014/045047, dated Jun. 3, 2015, 15 pgs.

* cited by examiner

WELDING RESOURCE PERFORMANCE GOAL SYSTEM AND METHOD

BACKGROUND

The invention relates generally to metal fabrication including heating systems, cutting systems, welding systems and support equipment for heating, cutting, and welding operations. In particular, the invention relates to techniques for setting goals for performance of such systems, and for monitoring and analyzing actual performance against such goals.

A wide range of welding systems have been developed, along with ancillary and support equipment for various fabrication, repair, and other applications. For example, welding systems are ubiquitous throughout industry for assembling parts, structures and sub-structures, frames, and many components. These systems may be manual, automated or semi-automated. A modern manufacturing and fabrication entity may use a large number of metal fabrication systems, and these may be grouped by location, task, job, and so forth. Smaller operations may use metal fabrication systems from time to time, but these are often nevertheless critical to their operations. For some entities and individuals, metal fabrication systems may be stationary or mobile, such as mounted on carts, trucks, and repair vehicles. In all of these scenarios it is increasingly useful to set performance criteria, monitor performance, analyze performance, and, wherein possible, report performance to the operator and/or to management teams and engineers. Such analysis allows for planning of resources, determinations of prices and profitability, scheduling of resources, enterprise-wide accountability, among many other uses.

Systems designed to gather, store, analyze and report welding system performance have not, however, reached a point where they are easily and effectively utilized. In some entities limited tracking of welds, weld quality, and system and operator performance may be available. However, these do not typically allow for any significant degree of analysis, tracking or comparison. Improvements are needed in such tools. More specifically, improvements would be useful that allow for data to be gathered at one or multiple locations and from one or multiple systems, analysis performed, and reports generated and presented at the same or other locations. Other improvements might include the ability to retrospectively review performance, and to see performance compared to goals and similar systems across groups and entities.

BRIEF DESCRIPTION

The present disclosure sets forth systems and methods designed to respond to such needs. In accordance with certain aspects of the disclosure, a metal fabrication resource performance monitoring method, comprises accessing data representative of a parameter sampled during a metal fabrication operation of a metal fabrication resource, the resource being selectable by a user from a listing of individual and groups of resources. Via at least one computer processor, the accessed parameter is compared to a stored goal for the parameter, and a user viewable report page is populated with graphical indicia representative of the comparison, and transmitted the user viewable report page to a user.

Also disclosed is a metal fabrication resource performance monitoring system, comprising a communications component that in operation accesses data representative of a parameter sampled during a metal fabrication operation of a metal fabrication resource, the resource being selectable by a user from a listing of individual and groups of resources. At least one computer processor compares the accessed parameter to a stored goal for the parameter, and populates a user viewable report page with graphical indicia representative of the comparison. A transmission component transits the user viewable report page to a user.

DRAWINGS

These and other features, aspects, and advantages of the present invention will become better understood when the following detailed description is read with reference to the accompanying drawings in which like characters represent like parts throughout the drawings, wherein:

FIG. 10 is an exemplary web page view listing historical welds that may be analyzed and presented;

DETAILED DESCRIPTION

Figure 1:
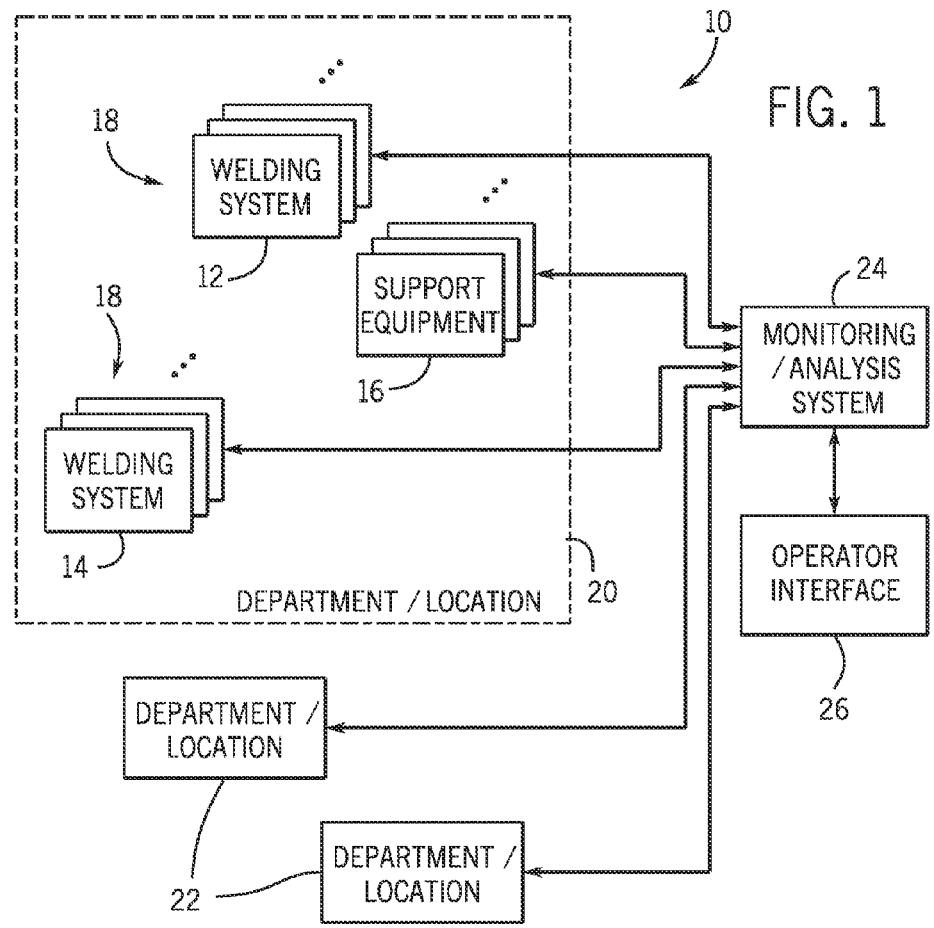
FIG. 1 is a diagrammatical representation of exemplary monitoring system for gathering information, storing information, analyzing the information, and presenting analysis results in accordance with aspects of the present disclosure, here applied to a large manufacturing and fabrication entity.

As illustrated generally in FIG. 1, a monitoring system 10 allows for monitoring and analysis of one or multiple metal fabrication systems and support equipment. In this view, multiple welding systems 12 and 14 may be interacted with, as may be support equipment 16. The welding systems and support equipment may be physically and/or analytically grouped as indicated generally by reference numeral 18. Such grouping may allow for enhanced data gathering, data analysis, comparison, and so forth. As described in greater detail below, even where groupings are not physical (i.e., the systems are not physically located near one another), highly flexible groupings may be formed at any time through use of the present techniques. In the illustrated embodiment, the equipment is further grouped in a department or location as indicated by reference numeral 20. Other departments and locations may be similarly associated as indicated by reference numeral 22. As will be appreciated by those skilled in the art, in sophisticated manufacturing and fabrication entities, different locations, facilities, factories, plants, and so forth may be situated in various parts of the same country, or internationally. The present techniques allow for collection of system data from all such systems regardless of their location. Moreover, the groupings into such departments, locations and other equipment sets are highly flexible, regardless of the actual location of the equipment.

In general, as represented in FIG. 1, the system includes a monitoring/analysis system 24 that communicates with the monitoring welding systems and support equipment, and that can collect information from these when desired. A number of different scenarios may be envisaged for accessing and collecting the information. For example, certain welding systems and support equipment will be provided with sensors, control circuitry, feedback circuits, and so forth that allow for collection of welding parameter data. Some details of such systems are described below. Where system parameters such as arc on time are analyzed, for example, data may be collected in each system reflecting when welding arcs are established and times during which welding arcs are maintained. Currents and voltages will commonly be sensed and data representative of these will be stored. For support equipment, such as grinders, lights, positioners, fixtures, and so forth, different parameters may be monitored, such as currents, switch closures, and so forth.

As noted, many systems will be capable of collecting such data and storing the data within the system itself. In other scenarios, local networks, computer systems, servers, shared memory, and so forth will be provided that can centralize at least at some extent the data collected. Such networks and support components are not illustrated in FIG. 1 for clarity. The monitoring/analysis system 24, then, may collect this information directly from the systems or from any support component that themselves collect and store the data. The data will typically be tagged with such identifying information as system designations, system types, time and date, part and weld specification, where applicable, operator and/or shift identifications, and so forth. Many such parameters may be monitored on a regular basis and maintained in the system. The monitoring/analysis system 24 may itself store such information, or may make use of extraneous memory.

As described more fully below, the system allows for grouping of the information, analysis of the information, and presentation of the information via one or more operator interfaces 26. In many cases the operator interface may comprise a conventional computer workstation, a handheld device, a tablet computer, or any other suitable interface. It is presently contemplated that a number of different device platforms may be accommodated, and web pages containing useful interfaces, analysis, reports, and the like will be presented in a general purpose interface, such as a browser. It is contemplated that, although different device platforms may use different data transmission and display standards, the system is generally platform-agnostic, allowing reports and summaries of monitored and analyzed data to be requested and presented on any of a variety of devices, such as desktop workstations, laptop computers, tablet computers, hand-held devices and telephones, and so forth. The system may include verification and authentication features, such as by prompting for user names, passwords, and so forth.

Figure 2:
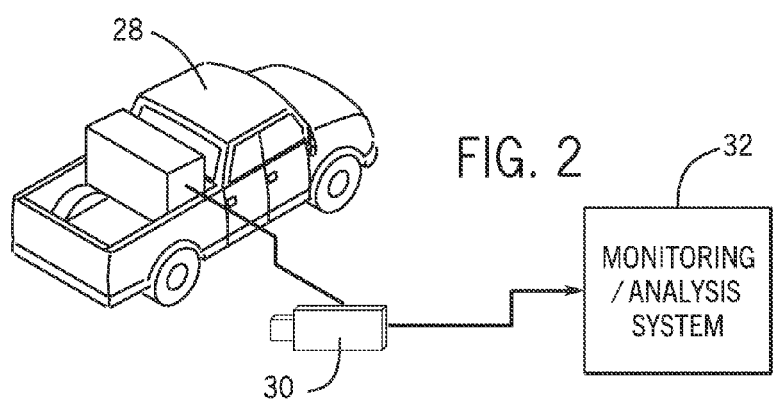
FIG. 2 is a diagrammatical view of an application of the system for a single or mobile welding system with which the techniques may be applied.

The system may be designed for a wide range of welding system types, scenarios, applications, and numbers. While FIG. 1 illustrates a scenario that might occur in a large manufacturing or fabrication facility or entity, the system may equally well applied to much smaller applications, and even to individual welders. As shown in FIG. 2, for example, even welders that operate independently and in mobile settings may be accommodated. The application illustrated of FIG. 2 is an engine-driven generator/welder 28 provided in a truck or work vehicle. In these scenarios, it is contemplated that data may be collected by one of several mechanisms. The welder itself may be capable of transmitting the data wirelessly via its own communications circuitry, or may communicate data via a device connected to the welding system, such as communications circuits within the vehicle, a smart phone, a tablet or laptop computers, and so forth. The system could also be tethered to a data collection point when it arrives at a specified location. In the illustration of FIG. 2 a removable memory device 30, such as a flash drive may be provided that can collect the information from the system and move the information into a monitoring/analysis system 32. In smaller applications of this type, the system may be particularly designed for reduced data sets, and analysis that would be more useful to the welding operators and entities involved. It should be apparent to those skilled in the art, then, that the system can be scaled and adapted to any one of a wide range of use cases.

Figure 3:
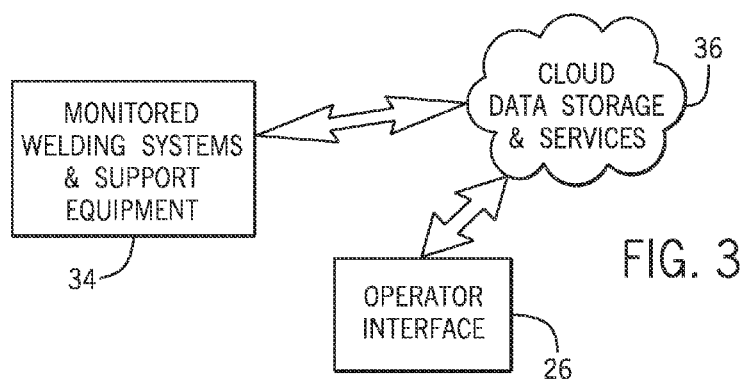
FIG. 3 is a diagrammatical representation of an exemplary cloud-based implementation of the system.

FIG. 3 illustrates an exemplary implementation, for example, which is cloud-based. This implementation is presently contemplated for many scenarios in which data collection, storage, and analysis are performed remotely, such as on a subscription or paid service basis. Here the monitored welding system and support equipment 34 communicate directly and indirectly with one or more cloud data storage and services entities 36. The entities may take any desired form, and significant enhancements in such services are occurring and will continue to occur in coming years. It is contemplated, for example, that a third party provider may contract with a fabricating or manufacturing entity to collect information from the systems, store the information off-site, and perform processing on the information that allows for the analysis and reporting described below. The operator interfaces 26 may be similar to those discussed above, but would typically be addressed to ("hit") a website for the cloud-based service. Following authentication, then, web pages may be served that allow for the desired monitoring, analysis and presentation. The cloud-based services would therefore include components such as communications devices, memory devices, servers, data processing and analysis hardware and software, and so forth.

As noted above, many different types and configurations of welding systems may be accommodated by the present techniques. Those skilled in the welding arts will readily appreciate that certain such systems have become standards throughout industry. These include, for example, systems commonly referred to as gas metal arc welding (GMAW), gas tungsten gas arc welding (GTAW), shielded metal arc welding (SMAW), submerged arc welding (SAW), laser, and stud welding systems to mention only a few. All such systems rely on application of energy to workpieces and electrodes to at least partially melt and fuse metals. The systems may be used with or without filler metal, but most systems common in industry do use some form of filler metal which is either machine or hand fed. Moreover, certain systems may be used with other materials than metals, and these systems, too, are intended to be serviced where appropriate by the present techniques.

Figure 4:
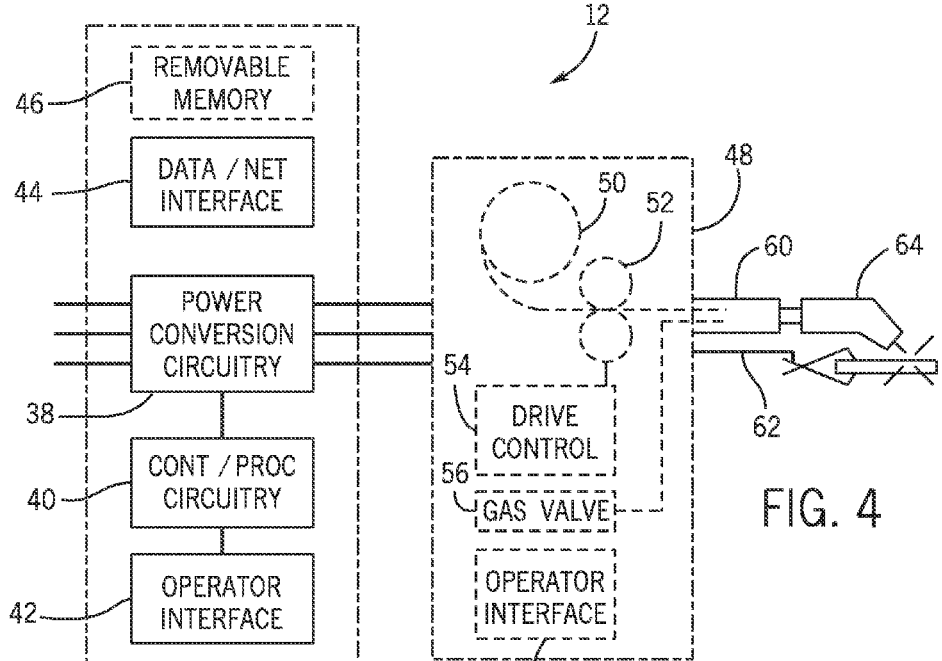
FIG. 4 is a diagrammatical view of an exemplary welding system of the type that might be monitored and analyzed in accordance with the techniques.

By way of example only, FIG. 4 illustrates an exemplary welding system 12, in this case a MIG welding system. The system includes a power supply that receives incoming power, such as from a generator or the power grid and converts the incoming power to weld power. Power conversion circuitry 38 allows for such conversion, and will typically include power electronic devices that are controlled to provide altering current (AC), direct current, pulsed or other waveforms as defined by welding processes and procedures. The power conversion circuitry will typically be controlled by control and processing circuitry 40. Such circuitry will be supported by memory (not separately shown) that stores welding process definitions, operator-set parameters, and so forth. In a typical system, such parameters may be set via an operator interface 42. The systems will include some type of data or network interface as indicated at reference numeral 44. In many such systems this circuitry will be included in the power supply, although it could be located in a separate device. The system allows for performing welding operations, collecting both control and actual data (e.g., feedback of voltages, currents, wire feed speeds, etc.). Where desired, certain of this data may be stored in a removable memory 46. In many systems, however, the information will be stored in the same memory devices that support the control and processing circuitry 40.

In the case of a MIG system, a separate wire feeder 48 may be provided. The components of the wire feeder are illustrated here in dashed lines because some systems may optionally use wire feeders. The illustrated system, again, intended only to be exemplary. Such wire feeders, where utilized typically include a spool of welding wire electrode wire 50 and a drive mechanism 52 that contacts and drives the wire under the control of a drive control circuitry 54. The drive control circuitry may be set to provide a desired wire feed speed in a conventional manner. In a typical MIG system a gas valve 56 will allow for control of the flow of the shield and gas. Setting on the wire feeder may be made via an operator interface 58. The welding wire, gas, and power is provided by a weld cable as indicated diagrammatically at reference numeral 60, and a return cable (sometimes referred to as a ground cable) 62. The return cable is commonly coupled to a workpiece via a clamp and the power, wire, and gas supplied via the weld cable to a welding torch 64.

Here again, it should be noted that the system of FIG. 4 is exemplary only, the present techniques allow for monitoring and analysis of performance of these types of cutting, heating, and welding systems, as well as others. Indeed, the same monitoring analysis system may collect data from different types, makes, sizes, and versions of metal fabrication systems. The data collected and analyzed may relate to different processes and weld procedures on the same or different systems. Moreover, as discussed above, data may be collected from support equipment used in, around or with the metal fabrication systems.

Figure 5:
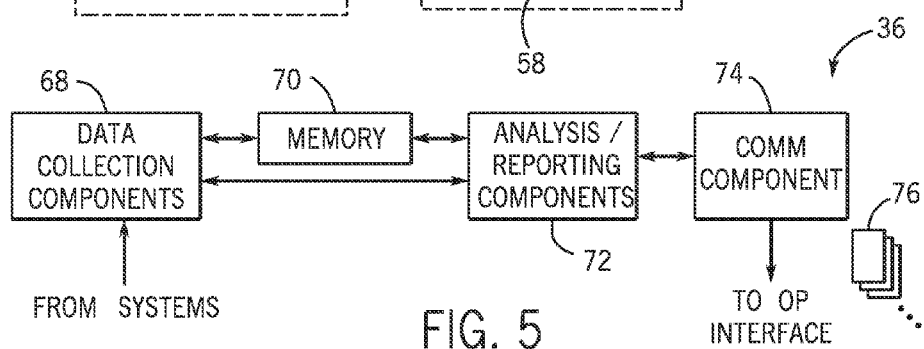
FIG. 5 is a diagrammatical representation of certain functional components of the monitoring and analysis system.

FIG. 5 illustrates certain functional components that may typically be found in the monitoring/analysis system. In the notation used in FIG. 5, these components will be located in a cloud-based service entity, although similar components may be included in any one of the implementations of the system. The components may include, for example, data collection components 68 that receive data from systems and entities. The data collection components may "pull" the data by prompting data exchange with the systems, or may work on a "push" basis where data is provided to the data collection components by the systems without prompting (e.g., at the initiation of the welding system, network device, or management system to which the equipment is connected). The data collection may occur at any desired frequency, or at points in time that are not cyclic. For example, data may be collected on an occasional basis as welding operations are performed, or data may be provided periodically, such as on a shift basis, a daily basis, a weekly basis, or simple as desired by a welding operator or facilities management team. The systems will also include memory 70 that store raw and/or processed data collected from the systems. Analysis/reporting components 72 allow for processing of the raw data, and associating the resulting analysis with systems, entities, groups, welding operators, and so forth. Examples of the analysis and reporting component operations are provided in greater detail below. Finally, communications components 74 allow for populating reports and interface pages with the results of the analysis. A wide range of such pages may be provided as indicated by reference numeral 76 in FIG. 5, some of which are described in detail below. The communications components 74 may thus include various servers, modems, Internet interfaces, web page definitions, and the like.

As noted above, the present techniques allow for a wide range of data to be collected from welding systems and support equipment for setup, configuration, storage, analysis, tracking, monitoring, comparison and so forth. In the presently contemplated embodiments this information is summarized in a series of interface pages that may be configured as web pages that can be provided to and viewed on a general purpose browser. In practice, however, any suitable interface may be used. The use of general purpose browsers and similar interfaces, however, allows for the data to be served to any range of device platforms and different types of devices, including stationary workstations, enterprise systems, but also mobile and handheld devices as mentioned above. FIGS. 6-13 illustrate exemplary interface pages that may be provided for a range of uses.

Figure 6:
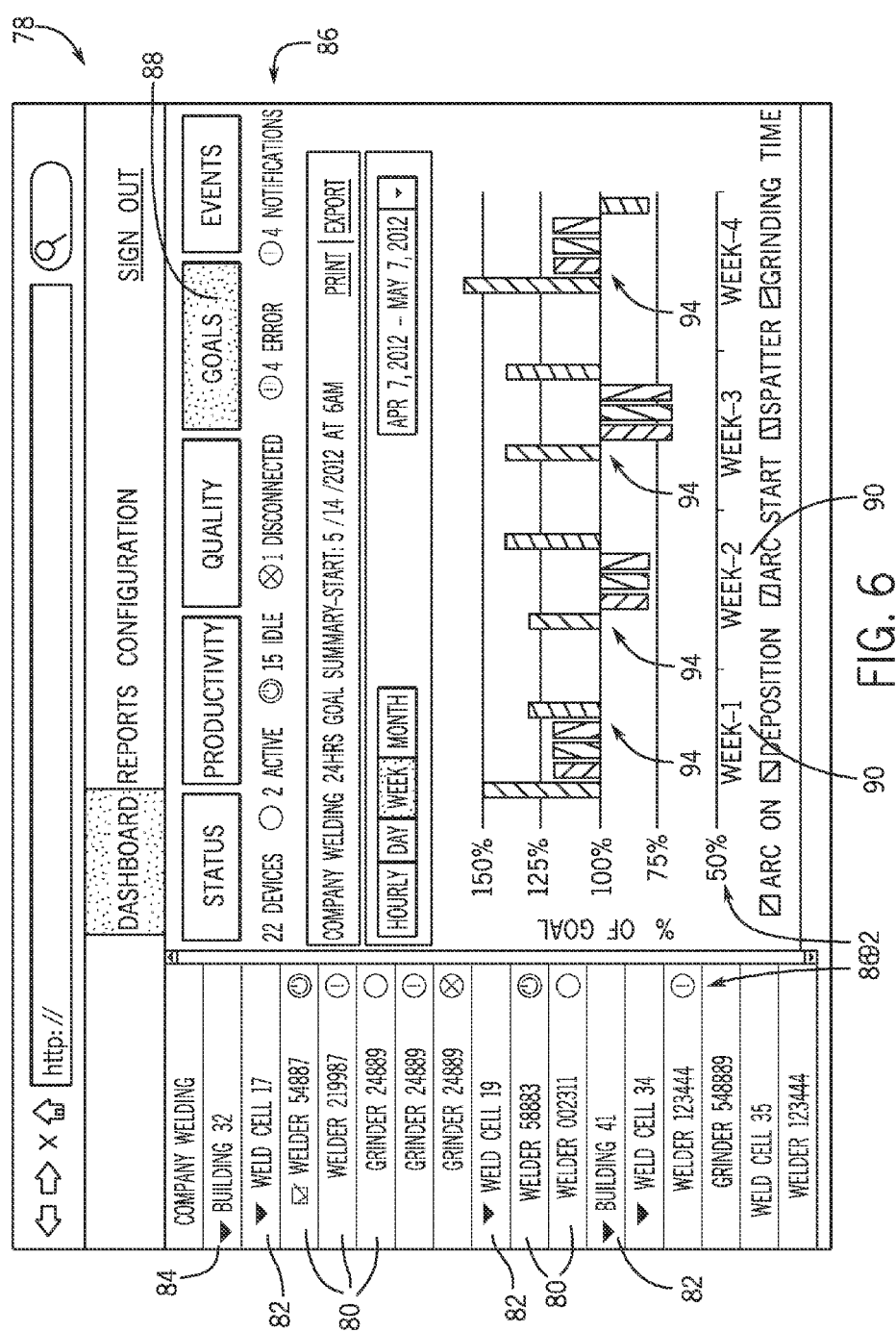
FIG. 6 is an exemplary web page view for reporting of a goals and performance of welding systems via the system.

Referring first to FIG. 6, a goal report page 78 is illustrated. This page allows for the display of one or more welding system and support equipment designations as well as performance analysis based upon goals set for the systems. In the page illustrated in FIG. 6, a number of welding systems and support equipment are identified as indicated at reference numeral 80. These may be associated in groups as indicated by reference numeral 82. In practice, the data underlying all of the analyses discussed in the present disclosure are associated with individual systems. These may be freely associated with one another, then, by the interface tools. In the illustrated example, a location or department 84 has been created with several groups designated within the location. Each of these groups, then, may include one or more welding systems and any other equipment as shown in the figure. The present embodiment allows for free association of these systems so that useful analysis of individual systems, groups of systems, locations, and so forth may be performed. The systems and support equipment may be in a single physical proximity, but this need not be the case. Groups may be created for example, based on system type, work schedules, production and products, and so forth. In systems where operators provide personal identification information, this information may be tracked in addition to or instead of system information.

In the illustrated embodiment status indicators are illustrated for conveying the current operational status of the monitored systems and equipment. These indicators, as designated by reference numeral 86, may indicate, for example, active systems, idle systems, disconnected systems, errors, notifications, and so forth. Where system status can be monitored on a real-time or near real-time basis, such indicators may provide useful feedback to management personnel on the current status of the equipment. The particular information illustrated in FIG. 6 is obtained, in the present implementation, by selecting (e.g., clicking on) a goals tab 88. The information presented may be associated in useful time slots or durations, such as successive weeks of use as indicated by reference numeral 90. Any suitable time period may utilized, such as hourly, daily, weekly, monthly, shift-based designations, and so forth.

The page 78 also presents the results of analysis of each of a range of performance criteria based upon goals set for the system or systems selected. In the illustrated example a welding system has been selected as indicated by the check mark in the equipment tree on the left, and performance on the basis of several criteria is presented in bar chart form. In this example, a number of monitored criteria are indicated, such as arc on time, deposition, arc starts, spatter, and grinding time. A goal has been set for the particular system as discussed below, and the performance of the system as compared to this goal is indicated by the bars for each monitored parameter. It should be noted that certain of the parameters may be positive in convention while others may be negative. That is, by way of example, for arc on times, representing the portion of the working time in which a welding arc is established and maintained, a percentage of goal exceeding the set standard may be beneficial or desirable. For other parameters, such as spatter, exceeding a goal may actually be detrimental to work quality. As discussed below, the present implementation allows for designation of whether the analysis and presentation may consider these conventionally positive or conventionally negative. The resulting presentations 94 allow for readily visualizing the actual performance as compared to the pre-established goals.

Figure 7:
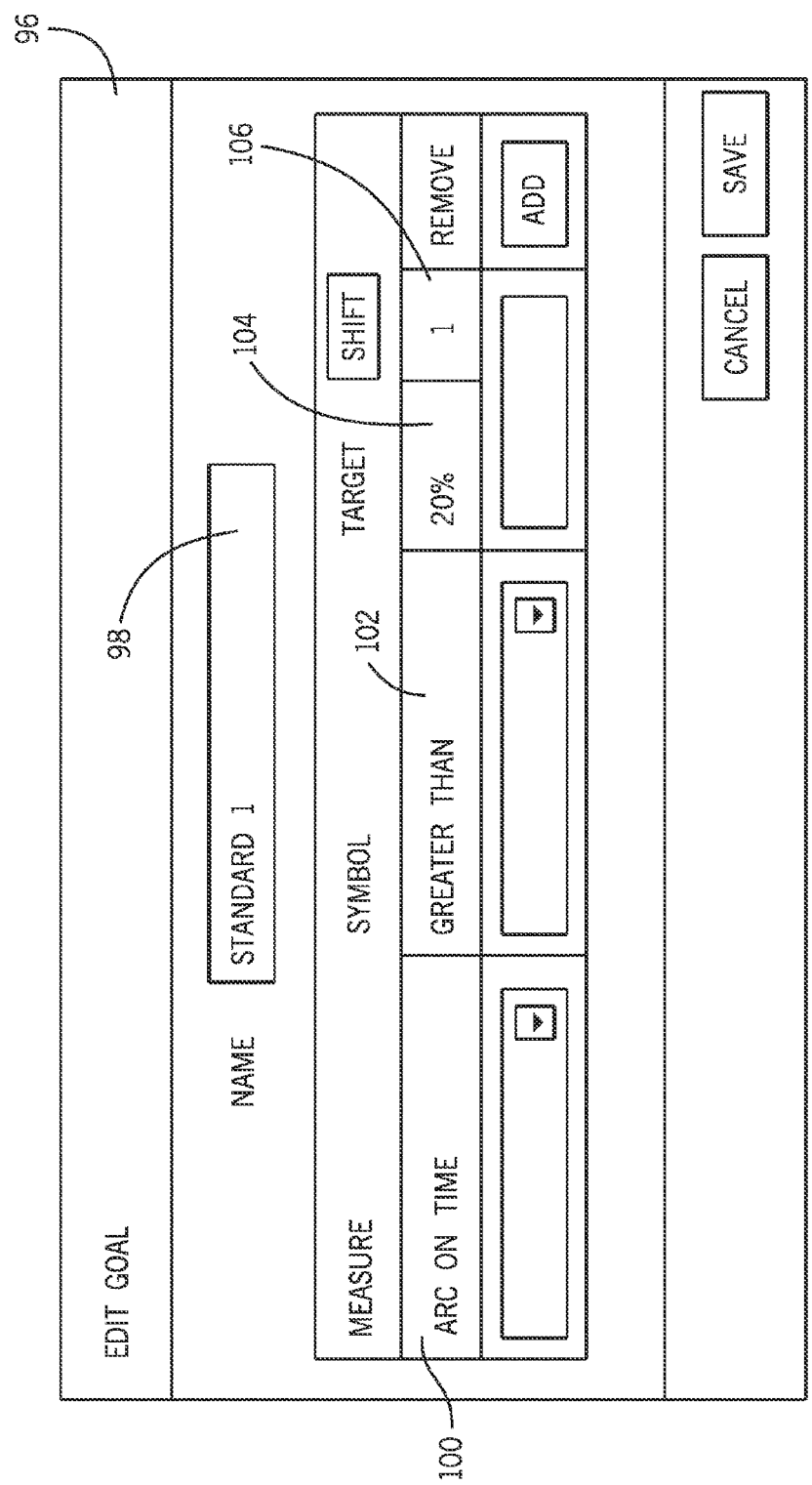
FIG. 7 is another exemplary web page view illustrating an interface for setting such goals.

FIG. 7 illustrates an exemplary goal editing page 96. Certain fields may be provided that allow for setting of standard or commonly used goals, or specific goals for specific purposes. For example, a name of the goal may be designated in a field 98. The other information pertaining to this name may be stored for use in analyzing the same or different systems. As indicated by reference numeral 100, the illustrated page allows for setting a standard for the goal, such as arc on time. Other standards and parameters may be specified so long as data may be collected that either directly or indirectly indicates the desired standard (i.e., allows for establishment of a value for comparison and presentation). A convention for the goal may be set as indicated at reference numeral 102. That is, as discussed above, certain goals it may be desired or beneficial that the established goal define a maximum value targeted, while other goals may establish a minimum value targeted. A target 104 may then be established, such as on a numerical percentage basis, an objective (e.g., unit) basis, relative basis, or any other useful basis. Further fields, such as a shift field 106 may be provided. Still further, in some implementations it may be useful to begin goal or standard setting with an exemplary weld known to have been done and possess characteristics that are acceptable. Goals may then be set with this as a standard, or with one or more parameters set based on this weld (e.g., +/−20%).

Figure 8:
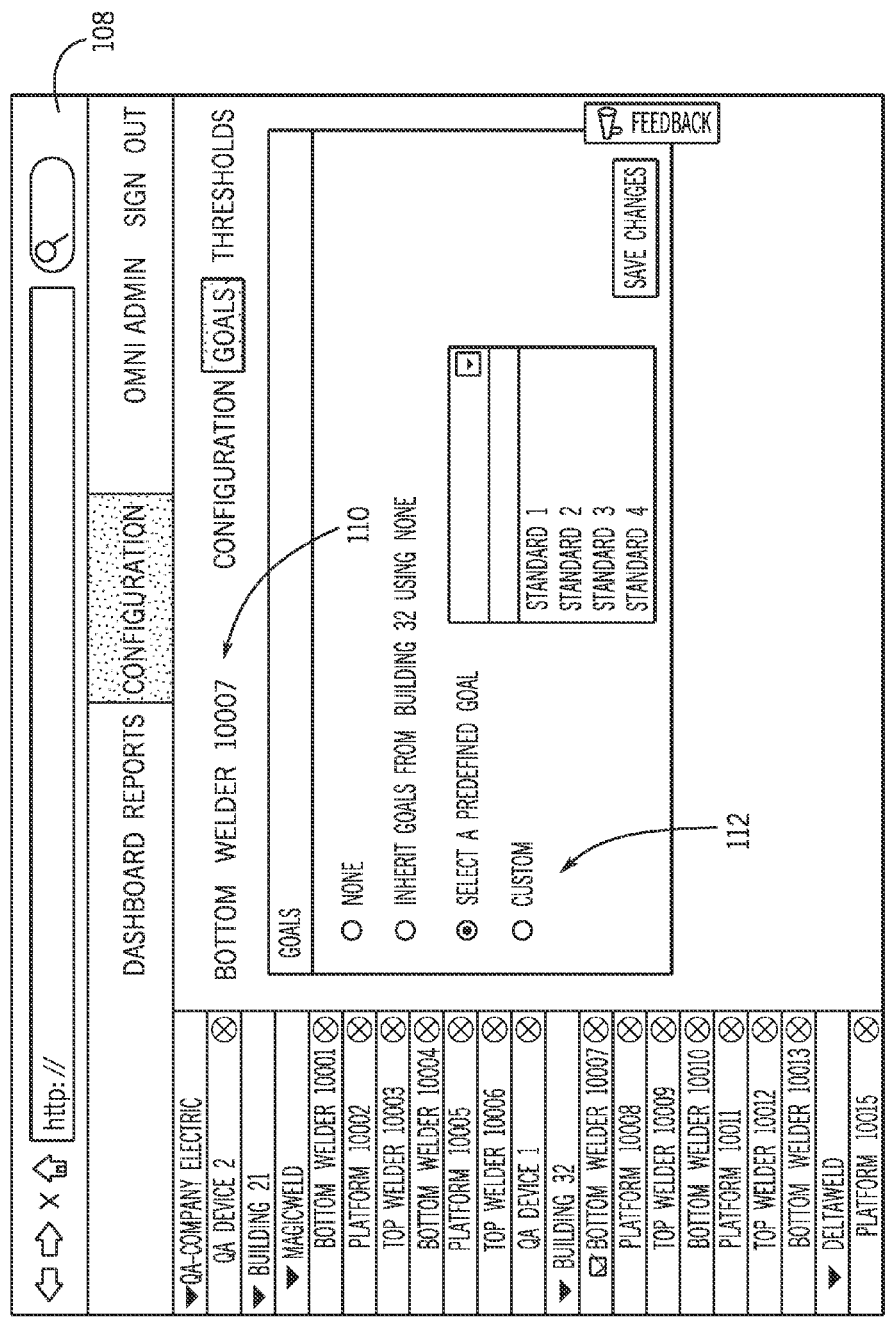
FIG. 8 is a further exemplary web page view of a goal setting interface.

FIG. 8 illustrates a goal setting page 108 that may take established goals set by pages such as that illustrated in FIG. 7 and apply them to specific equipment. In the page 108 of FIG. 8, a welding system designated "bottom welder" has been selected as indicated by the check mark to the left. The system identification 110 appears in the page. A menu of goals or standards is then displayed as indicated by reference numeral 112. In this example, selections include placing no goal on the equipment, inheriting certain goals set for a particular location (or other logical grouping), selecting a predefined goal (such as a goal established by a page such as thus shown in FIG. 7), and establishing a custom goal for the equipment.

Figure 9:
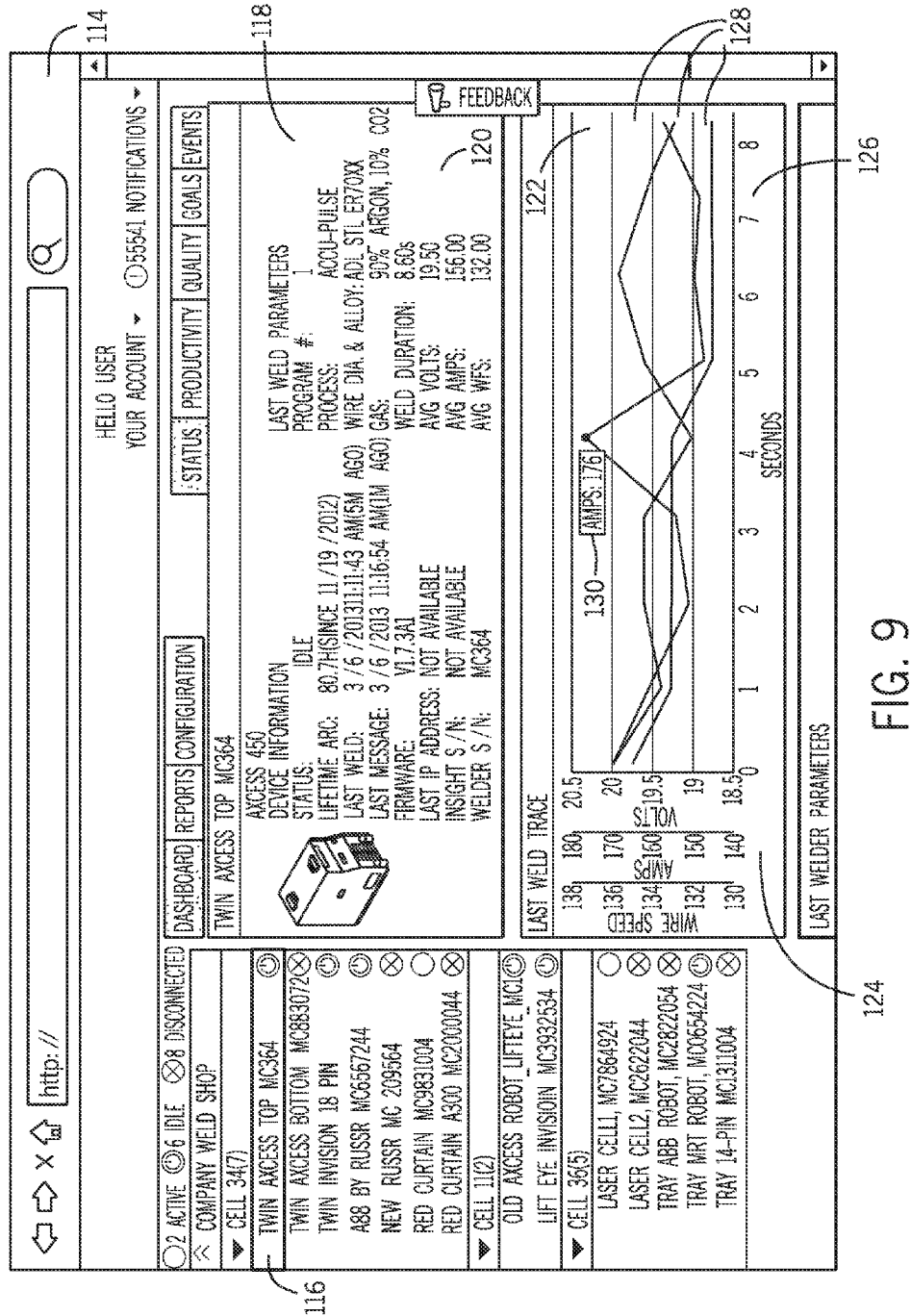
FIG. 9 is an exemplary web page view of an interface for tracing parameters of a particular weld or system.

The present techniques also allow for storing and analyzing certain performance parameters of systems in tracking or trace views. These views can be extremely informative in terms of specific welds, performance over certain periods of time, performance by particular operators, performance on particular jobs or parts, and so forth. An exemplary weld trace page 114 is illustrated in FIG. 9. As indicated on this page, a range of equipment may be selected as indicated on the left of the page, with one particular system being currently selected as indicated by reference numeral 116. Once selected, in this implementation a range of data relating to this particular system is displayed as indicated by reference numeral 118. This information may be drawn from the system or from archived data for the system, such as within an organization, within a cloud resource, and so forth. Certain statistical data may be aggregated and displayed as indicated at reference numeral 120.

The weld trace page also includes a graphical presentation of traces of certain monitor parameters that may be of particular interest. The weld trace section 122, in this example, shows several parameters 124 graphed as a function of time along a horizontal access 126. In this particular example, the parameters include wire feed speed, current, and volts. The weld for which the cases are illustrated in the example had duration of approximately 8 seconds. During this time the monitored parameters changed, and data reflective of these parameters was sampled and stored. The individual traces 128 for each parameter are then generated and presented to the user. Further, in this example by a "mouse over" or other input the system may display the particular value for one or more parameters at a specific point in time as indicated by reference numeral 130.

Figure 10:
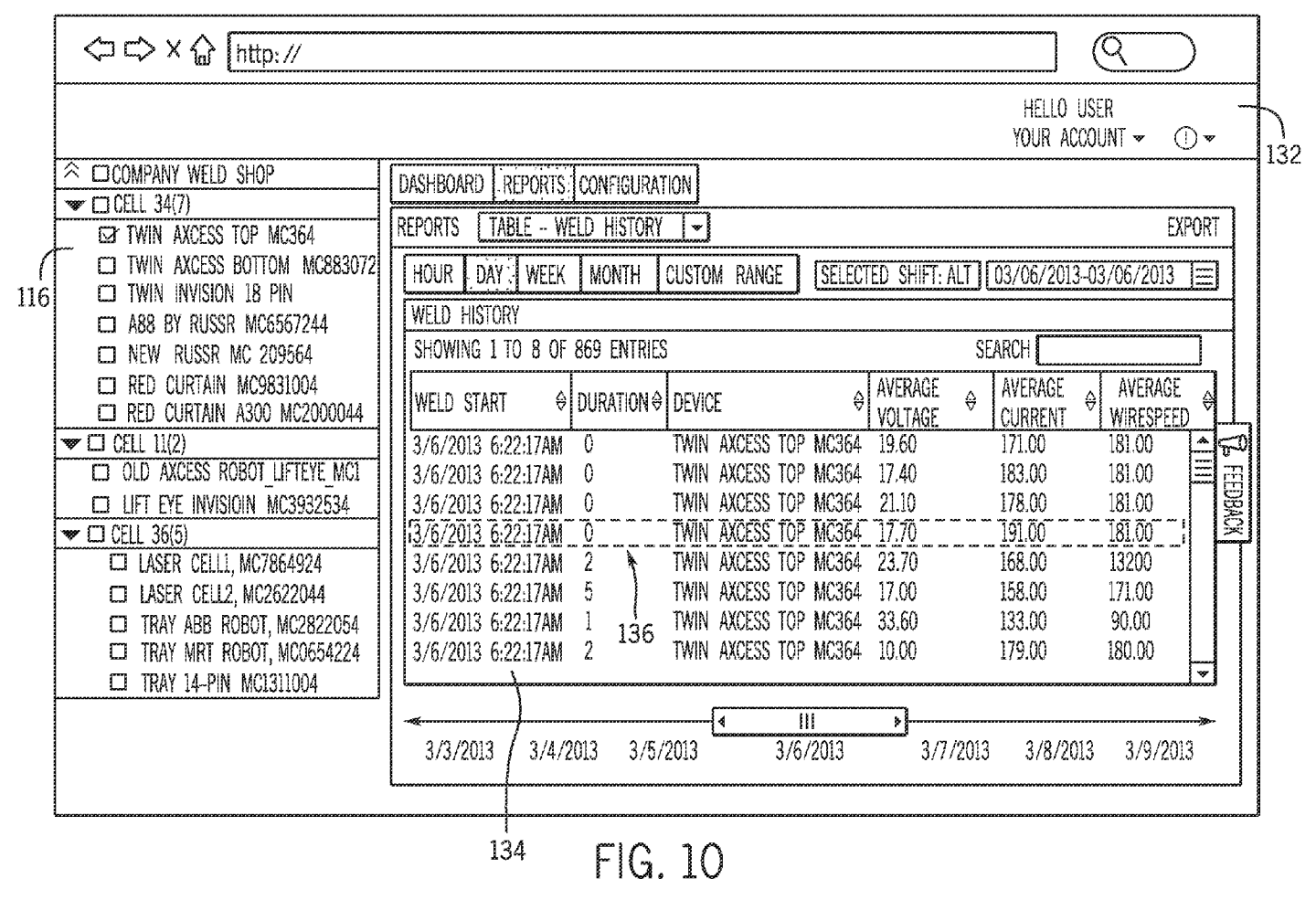

The trace pages may be populated, as may any of the pages discussed in the present disclosure, in advance or upon demand by a user. This being the case, the trace pages for any number of systems, and specific welds may be stored for later analysis and presentation. A history page 132 may thus be compiled, such as illustrated in FIG. 10. In the history page illustrated, a list of welds performed on a selected system 116 (or combination of selected systems) is presented as indicated by reference numeral 134. These welds may be identified by times, system, duration, weld parameters, and so forth. Moreover, such lists may be compiled for specific operators, specific products and articles of manufacture, and so forth. In the illustrated embodiment, a particular weld has been selected by the user as indicated at reference numeral 136.

Figure 11:
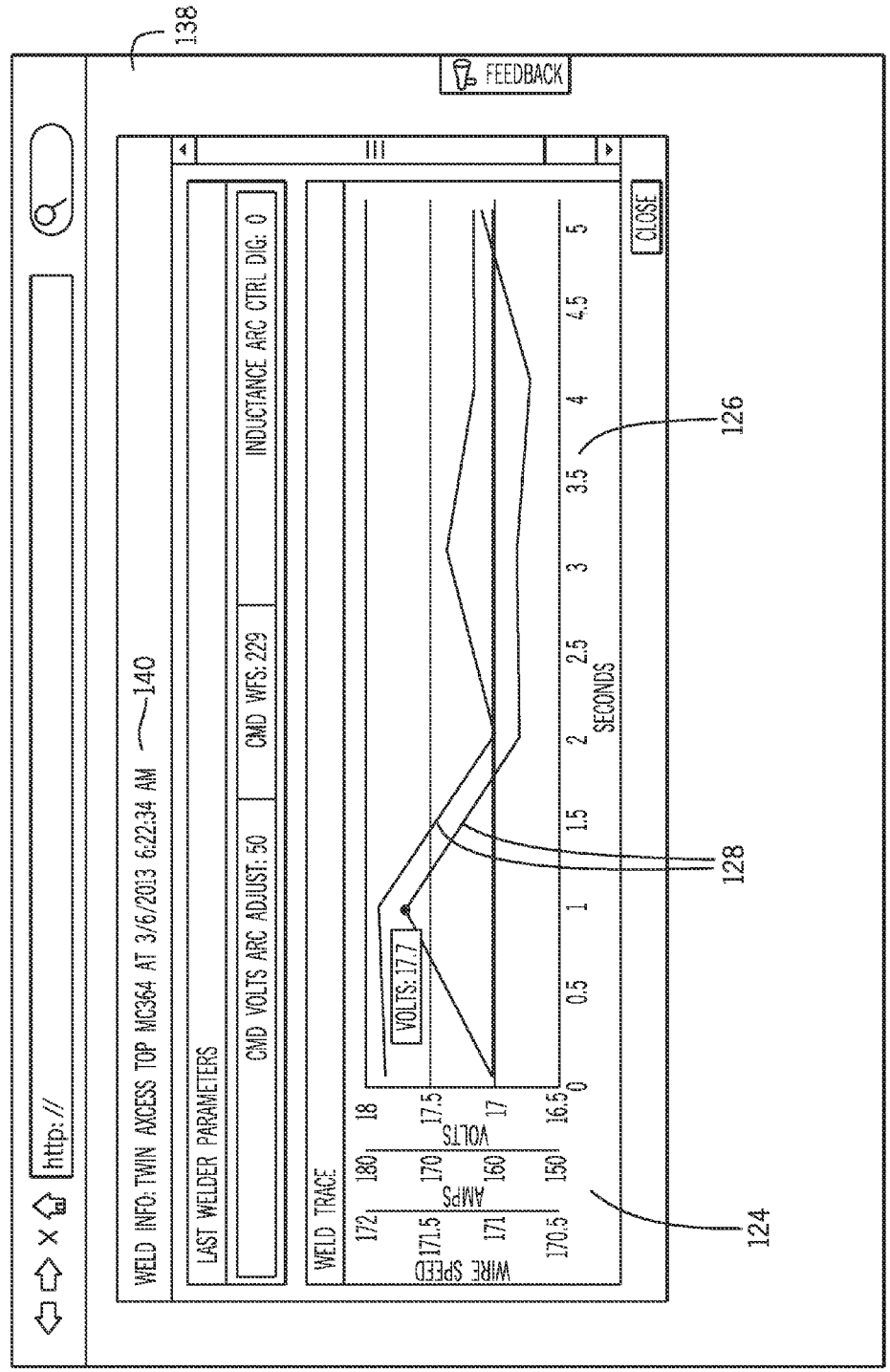
FIG. 11 is an exemplary web page view of historical traces available via the system.

FIG. 11 illustrates an historical trace page 138 that may be displayed following selection of the particular weld 136. In this view, an identification of the system, along with the time and date, are provided as indicated by reference numeral 140. Here again, monitored parameters are identified as indicated by reference numeral 124, and a time axis 126 is provided along which traces 128 are displayed. As will be appreciated by those skilled in the art, the ability to store and compile such analyses may be significantly useful in evaluating system performance, operator performance, performance on particular parts, performance of departments and facilities, and so forth.

Figure 12:
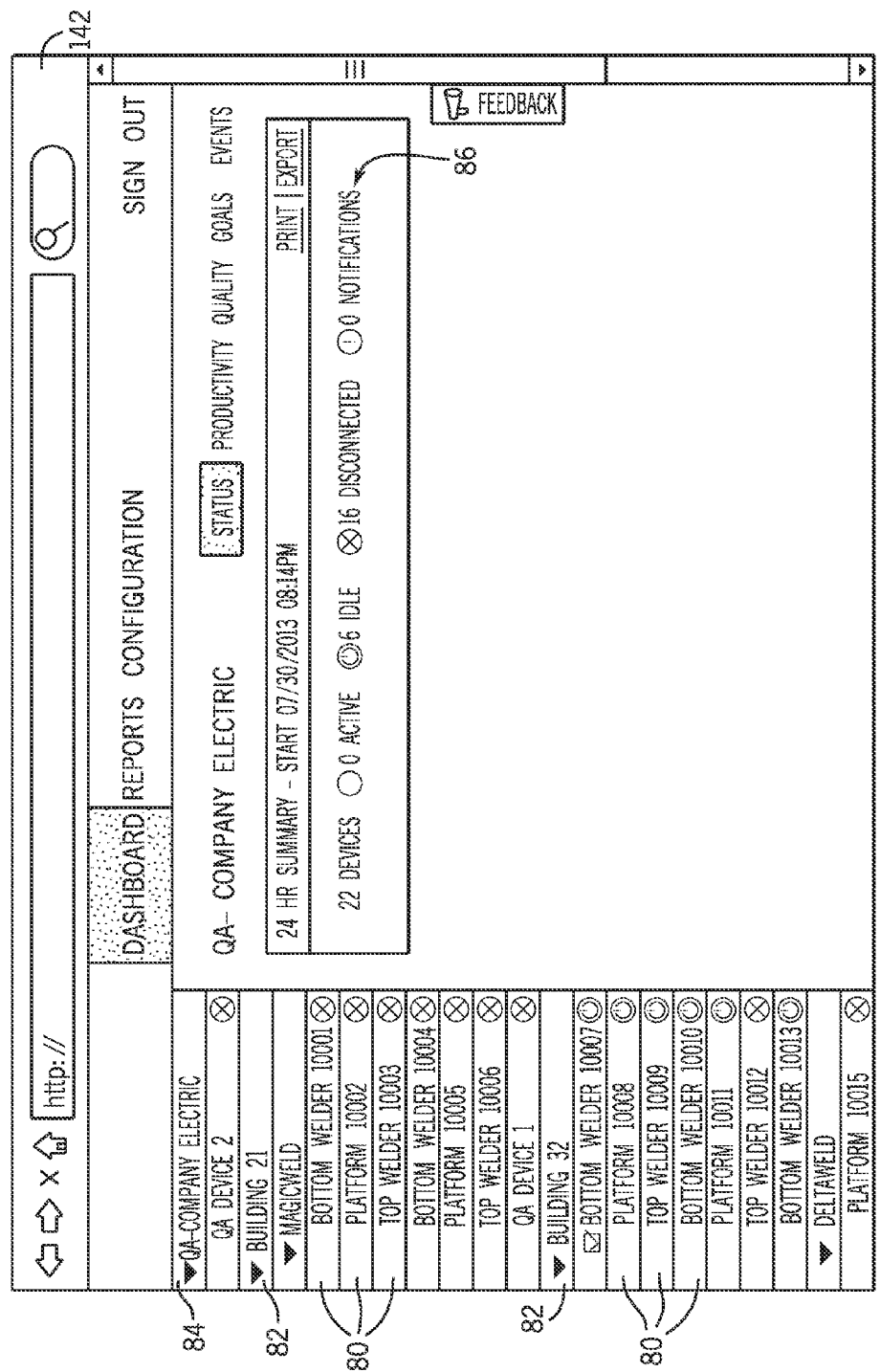
FIG. 12 is an exemplary web page view of a status interface allowing for selection of systems and groups of systems for comparison.
Figure 13:
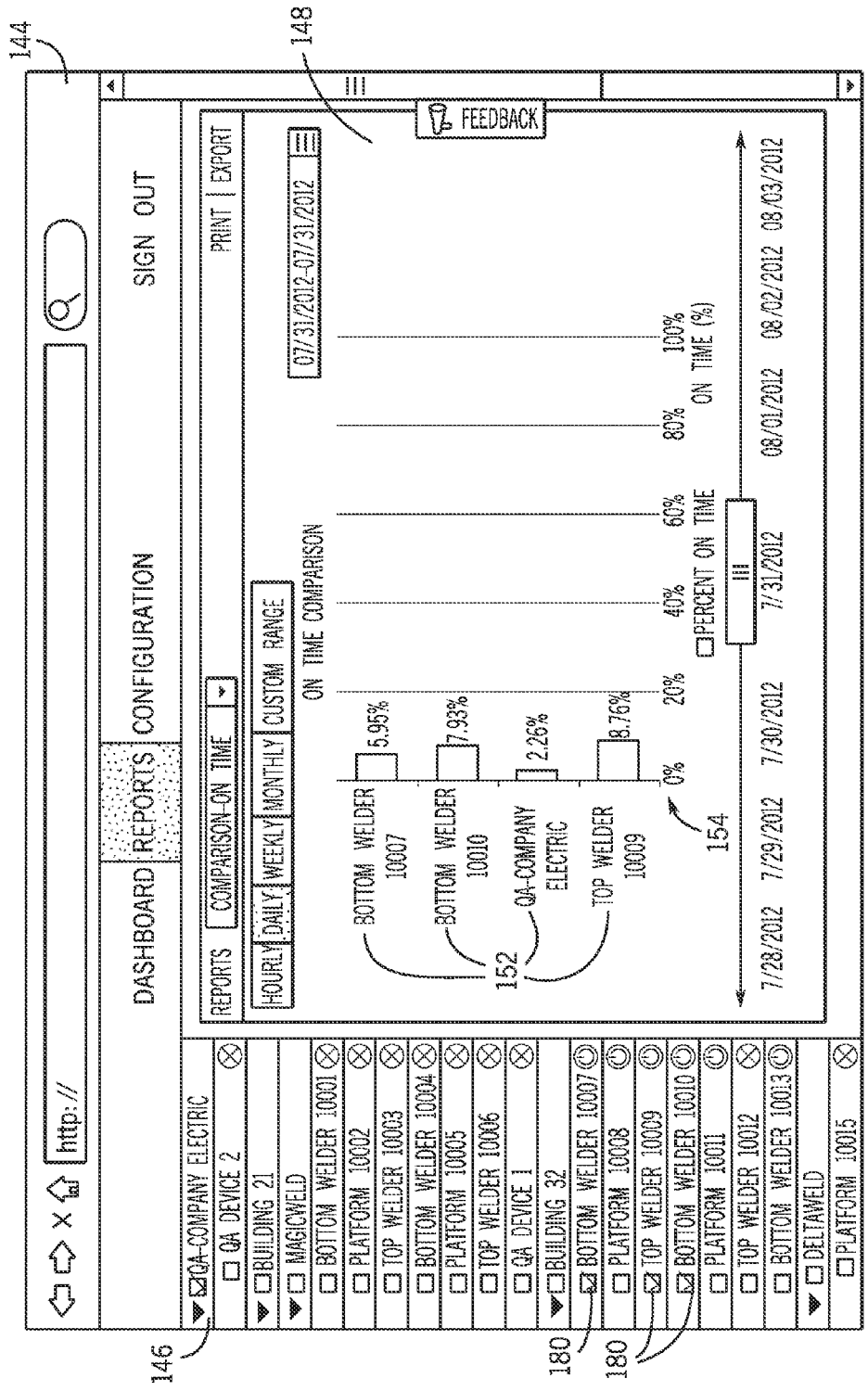
FIG. 13 is an exemplary web page view of a comparison of systems and groups of systems selected via the interface of FIG. 12.

Still further, the present techniques allow for comparisons between equipment on a wide range of bases. Indeed, systems may be compared, and presentations resulting from the comparison may be provided any suitable parameter that may form the basis for such comparisons. An exemplary comparison selection page 142 is illustrated in FIG. 12. As shown in this page, multiple systems 80 are again grouped into groups 82 for a facilities or locations 84. Status indicators 86 may be provided for the individual systems or groups. The status page illustrated in FIG. 12 may then serve as the basis for selecting systems for comparison as illustrated in FIG. 13. Here, the same systems and groups are available for selection and comparison. The comparison page 144 displays these systems and allows users to click or select individual systems, groups, or any sub-group that is created at will. That is, while an entire group of systems may be selected, the user may select individual systems or individual groups as indicated by reference numeral 146. A comparison section 148 is provided in which a time base for a comparison may be selected, such as on an hourly, daily, weekly, monthly, or any other range. Once selected, then, desired parameters are compared for the individual systems, with the systems being identified as indicated at reference numeral 152, and the comparisons being made and in this case graphically displayed as indicated by reference numeral 154. In the illustrated example, for example, system on time has been selected as a basis for the comparison. Data for each individual system reflective of the respective on time of the system has been analyzed and presented in a percentage basis by a horizontal bar. Other comparisons may be made directly between the systems, such as to indicate that one system has outperformed another on the basis of the selected parameter. More than one parameter could be selected in certain embodiments, and these may be based on raw, processed or calculated values.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system performance monitoring method, comprising:
   transmitting a user viewable operator selection page configured to allow a user to select an operator or a group of operators;
   accessing data representative of a plurality of performance parameters of the selected operator or group of operators sampled during a plurality of welding operations, wherein each performance parameter of the plurality of performance parameters is indicative of an aspect of performance of the operator or group of operators in using a welding system or a group of welding systems to perform the plurality of welding operations;
   transmitting a user viewable goal selection page configured to allow a user to select respective predefined goal for each performance parameter of the plurality of performance parameters to be applied to the selected operator or group of operators;
   collecting the data into corresponding ones of multiple time periods of a selected time base, each of the multiple time periods comprising a subset of the plurality of welding operations falling within the time period;
   via the at least one computer processor, populating a user viewable report page with graphical indicia representative of a comparison of each accessed performance parameter of the plurality of performance parameters to the selected respective goal for the performance parameter, based on the selected operator or group of operators and the selected stored goal, wherein the comparison is represented for the multiple time periods of the selected time base, wherein the data being compared corresponds to one of the multiple time periods of the selected time base, wherein the user viewable report page includes indicia representative of the plurality of performance parameters in each of the multiple time periods with respect to the goal; and
   transmitting the user viewable report page to a user viewing device.

2. The method of claim 1, wherein the plurality of performance parameters comprises are on time, deposition, arc starts, or spatter, or any combination thereof.

3. The method of claim 1, wherein the user viewable report page includes indicia identifying a plurality of welding systems, and wherein the comparisons are performed for a welding system selected by the user via the identifying indicia.

4. The method of claim 1, wherein the data is stored in a cloud resource.

5. The method of claim 1, wherein the comparisons and the population of the user viewable report page are performed in a cloud resource.

6. The method of claim 1, wherein the user viewable report page comprises a web page viewable in a browser.

7. The method of claim 1, comprising transmitting a user goal setting page configured to permit a user to set one or more of the plurality of predefined goals for the operator or group of operators.

8. The method of claim 1, comprising displaying the user viewable report page via the user viewing device.

9. A welding system performance monitoring system, comprising:
   a communications component that in operation:
      transmits a user viewable operator selection page configured to allow a user to select an operator or a group of operators;
      accesses data representative of a plurality of performance parameters of the selected operator or group of operators sampled during a plurality of welding operations, wherein each performance parameter of the plurality of performance parameters is indicative of an aspect of performance of the selected operator or group of operators in using a welding system or a group of welding systems to perform the plurality of welding operations;
      transmits a user viewable goal selection page configured to allow a user to select respective predefined goal for each performance parameter of the plurality of performance parameters to be applied to the selected operator or group of operators; and
      transmits a user viewable report page to a user viewing device; and
   at least one computer processor that in operation:
      collects the data into corresponding ones of multiple time periods of a selected time base, each of the multiple time periods comprising a subset of the plurality of welding operations falling within the time period; and
      populates the user viewable report page with graphical indicia representative of a comparison, based on the selected operator or group of operators and the selected stored goal, wherein the comparison is represented for the multiple time periods of the selected time base, wherein the data being compared corresponds to one of the multiple time periods of the selected time base, wherein the user viewable report page includes indicia representative of the plurality of performance parameters in each of the multiple time periods with respect to the goal.

10. The system of claim 9, wherein the plurality of performance parameters comprises arc on time, deposition, arc starts, or spatter, or a combination thereof.

11. The system of claim 9, wherein the user viewable report page includes indicia identifying a plurality of welding systems, wherein the comparisons are performed for a welding system selected from the plurality of welding systems by the user via the identifying indicia.

12. The system of claim 9, wherein the data is accessed from a cloud-based data storage system.

13. The system of claim 9, wherein the at least one computer processor comprises a cloud-based system.

14. The welding system performance monitoring system of claim 9, comprising the user viewing device that in operation displays the user viewable operator selection page, the user viewable goal selection page, or the user viewable report page, or a combination thereof.

15. A welding system performance monitoring interface, comprising:
a user viewable operator selection page configured to allow a user to select an operator or a group of operators sampled during a plurality of welding operations;
a user viewable report page comprising user viewable indicia identifying the selected operator or group of operators, multiple time periods of interest along a time base, and a plurality of performance parameters of interest representative of data sampled during the plurality of welding operations and collected into corresponding ones of the multiple time periods, wherein each performance parameter of the plurality of performance parameters of interest is indicative of an aspect of performance of the selected operator or group of operators in using a welding system or a group of welding systems, for the multiple time periods of interest as compared to a respective goal for each welding performance parameter of the plurality of performance parameters of interest, wherein the comparison is represented for the multiple time periods of the selected time base, wherein the data being compared corresponds to one of the multiple time periods of the selected time base, wherein each of the multiple time periods comprises a subset of the plurality of welding operations falling within the time period; and
a goal selection page configured to allow a user to select the respective goals from a plurality of predefined goals for each performance parameter of the plurality of performance parameters to be applied to the selected operator or group of operators.

16. The interface of claim 15, wherein the user viewable report page is defined by computer executed code executable by a processor and transmitted to a user viewing device for viewing in a general purpose browser.

17. The interface of claim 15, wherein the user viewable report page is configured to receive user selections of anyone of a plurality of welding systems for reporting.

18. The interface of claim 15, wherein the user viewable operator selection page is configured to allow the user to select at least a time period for reporting, or one or more performance parameter of the plurality of performance parameters for comparison.

19. A non-transitory tangible computer readable medium comprising executable instructions that when executed cause a processor to:
transmit a user viewable operator selection page configured to allow a user to select an operator or a group of operators;
access data representative of a plurality of performance parameter of the selected operator or group of operators sampled during a plurality of welding operations, wherein each performance parameter of the plurality of performance parameters is indicative of an aspect of performance of the operator or group of operators in using a welding system or a group of welding systems to perform the plurality of welding operations;
transmit a user viewable goal selection page configured to allow a user to select a respective predefined goal for each performance parameter of the plurality of performance parameters to be applied to the selected operator or group of operators;
collect the data into corresponding ones of multiple time periods of a selected time base, each of the multiple time periods comprising a subset of the plurality of welding operations falling within the time period;
populate a user viewable report page with graphical indicia representative of a comparison of each accessed performance parameter of the plurality of performance parameters to the selected respective goal for the performance parameter, based on the selected operator or group of operators and the selected stored goal, wherein the comparison is represented for the multiple time periods of the selected time base, wherein the data being compared corresponds to one of the multiple time periods of the selected time base, wherein the user viewable report page includes indicia representative of the plurality of performance parameters in each of the multiple time periods with respect to the goal; and
transmit the user viewable report page to a user viewing device.

20. The non-transitory tangible computer readable medium of claim 19, wherein the instructions comprise instructions that when executed cause the processor to perform the comparisons for a welding system selected by the user via the identifying indicia.

21. The non-transitory tangible computer readable medium of claim 19, wherein the instructions comprise instructions that when executed cause the processor to store data in a cloud resource.

22. The non-transitory tangible computer readable medium of claim 19, wherein the instructions comprise instructions that when executed cause the processor to perform the comparisons in a cloud resource.

23. The non-transitory tangible computer readable medium of claim 19, wherein the instructions comprise instructions that when executed cause the processor to populate the user viewable report page in a cloud resource.

24. The non-transitory tangible computer readable medium of claim 19, wherein the instructions comprise instructions that when executed cause the processor to transmit a user goal setting page configured to permit a user to set the respective goal for each performance parameter of the plurality of performance parameters of one or multiple systems.

25. The non-transitory tangible computer readable medium of claim 19, wherein the instructions comprise instructions that when executed cause the processor to display the user viewable report page via the user viewing device.

\* \* \* \* \*